Dec. 11, 1923.
B. H. SCHREIBER
TIRE
Filed April 18, 1922
1,477,453
2 Sheets-Sheet 1
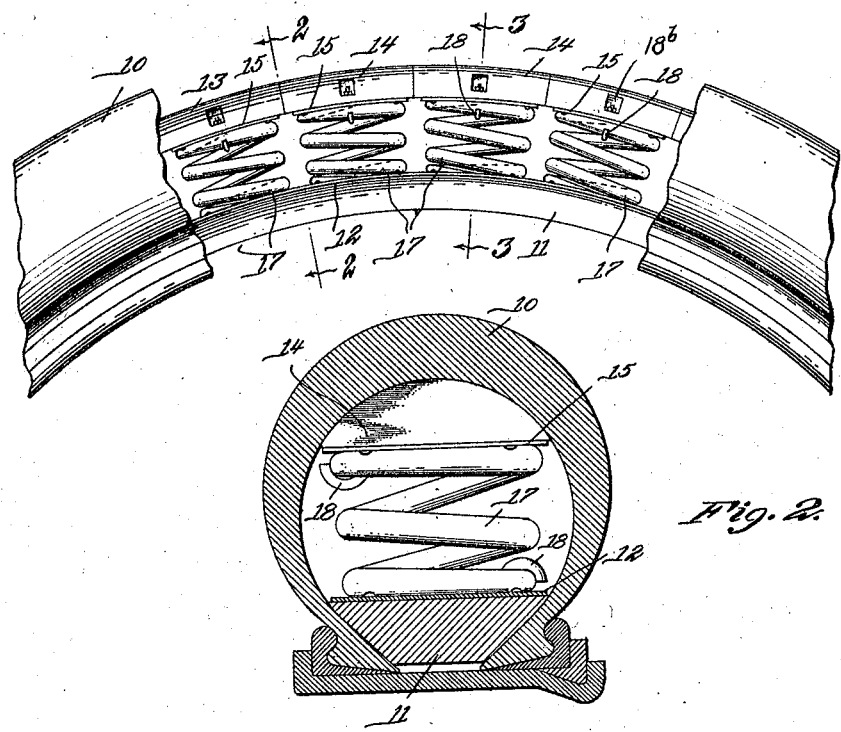
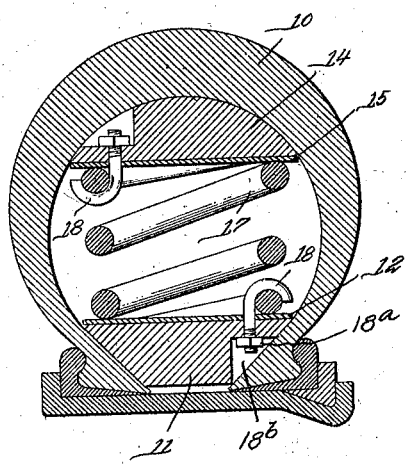
Benjamin H. Schreiber
INVENTOR
BY Victor J. Evans
ATTORNEY
WITNESS:

Dec. 11, 1923.
B. H. SCHREIBER
TIRE
Filed April 18, 1922

Benjamin H. Schreiber
INVENTOR

BY Victor J. Evans
ATTORNEY

Patented Dec. 11, 1923.

1,477,453

UNITED STATES PATENT OFFICE.

BENJAMIN H. SCHREIBER, OF GALVESTON, TEXAS.

TIRE.

Application filed April 18, 1922. Serial No. 554,815.

*To all whom it may concern:*

Be it known that I, BENJAMIN H. SCHREIBER, a citizen of the United States, residing at Galveston, in the county of Galveston and State of Texas, have invented new and useful Improvements in Tires, of which the following is a specification.

This invention relates to improvements in resilient tires and has for an object the provision of a tire which will embody the resilient quantities of the usual pneumatic tire, but which is constructed so as to render it free of the annoyances from the punctures, blowouts and similar trouble commonly experienced with an air inflated tire.

Another object of the invention is the provision of a resilient tire, wherein the means employed for holding the tire extended, are capable of being freely compressed, but are maintained in their proper relative positions to insure their proper operation.

Another object of the invention is the provision of a tire of the above character which includes in its construction compressible blocks or strips, separated by springs or similar resilient members, with means interposed between the springs and compressible strips to prevent wear upon the latter and provide means for connecting the strips to the springs.

With the above and other objects in view, the invention further includes the following novel features and details of construction, to be hereinafter more fully described, illustrated in the accompanying drawings and pointed out in the appended claim.

In the drawings:—

Figure 1 is a fragmentary elevation of a tire, partly broken away, to more clearly illustrate the invention.

Figure 2 is an enlarged section on the line 2—2 of Figure 1.

Figure 3 is a similar view on the line 3—3 of Figure 1.

Figure 4:
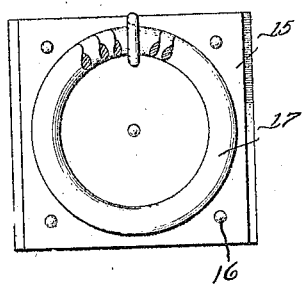
Figure 4 is a detail plan view showing one of the sections of the outer resilient strip with a spring connected thereto and illustrating the means of securing an individual wear plate to the strip.
Figure 5:
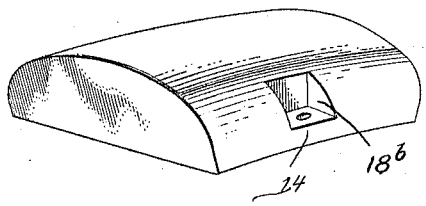
Figure 5 is a detail perspective view of one of the sections of the outer resilient strip.
Figure 6:
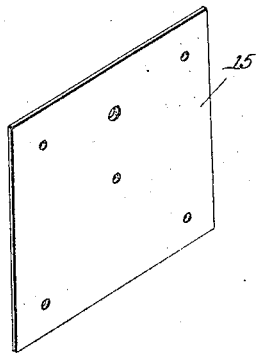
Figure 6 is a like view of an individual wear plate used in connection with the strip.

Referring in detail to the drawings, wherein like characters of reference denote corresponding parts, the invention is shown in connection with a casing 10 of the usual or any preferred construction, the invention being capable of use within any tire casings now in general use.

Located within the casing 10 is an inner continuous resilient strip 11, which is preferably formed of rubber or other compressible material, while secured to this strip through the medium of suitable fastening devices, is a wear plate 12, which is also continuous and which extends entirely around the outer face of the strip.

Also located within the casing is an outer sectional strip 13, which is formed of separate blocks or sections 14, constructed of rubber or other compressible material. Secured to each of the block sections 14 is an individual wear plate 15, the latter being secured through the medium of fastening devices 16, which may be in the form of screws, nails, rivets or the like.

Connecting the inner strip 11 with the outer strip 13 are springs 17, there being provided one spring for each of the block sections 14. These springs are connected to the plates 12 and 15, by means of hooks or clips 18, and the latter are secured by means of nuts $18^a$, which are positioned within recesses $18^b$ provided in the strips 11 and 13.

By this means, a maximum amount of resiliency is obtained, the strips 11 and 13 being compressible, while the block sections 14 of the strip 13 are relatively movable, due to the action of the springs 17. As the block sections 14 are connected to the continuous strip 11 through the medium of the springs and wear plates, the said block sections are maintained in their proper positions during the action of the tire and wear upon the strips 11 and 13 is prevented by the plates 12 and 15.

The invention is susceptible of various changes in its form, proportions and minor details of construction and the right is herein reserved to make such changes as properly fall within the scope of the appended claim.

Having described the invention what is claimed is:—

The combination with a tire casing, of a circumferential rubber strip arranged between the clencher edges of the casing and being provided with a plurality of recesses arranged adjacent the side edges thereof, a circumferential band secured to said strip, a plurality of substantially plano-convex compressible rubber block segments arranged in abutting relation at the crest of the tire casing and each of said blocks being provided with a laterally disposed recess, a coil spring interposed between each block segment and the strip respectively, a hook shaped bolt carried by each of the block segments and engaging one of the convolutions of each of the springs, said hook shaped bolts being countersunk in the respective recesses of the respective blocks, and a plurality of similar shaped bolts as the above mentioned bolts carried in the recesses of the strip and engaging one of the convolutions of each of the springs at a point substantially diametrically opposite the other hook bolt.

In testimony whereof I affix my signature.

BENJAMIN H. SCHREIBER.